United States Patent [19]
Collins

[11] Patent Number: 6,158,000
[45] Date of Patent: Dec. 5, 2000

[54] SHARED MEMORY INITIALIZATION METHOD FOR SYSTEM HAVING MULTIPLE PROCESSOR CAPABILITY

[75] Inventor: David L. Collins, Magnolia, Tex.

[73] Assignee: Compaq Computer Corporation, Houston, Tex.

[21] Appl. No.: 09/158,165

[22] Filed: Sep. 18, 1998

[51] Int. Cl.$^7$ .............................. G06F 15/177; G06F 9/00; G06F 15/00
[52] U.S. Cl. ...................................... 713/1; 713/2; 712/21
[58] Field of Search ................................ 713/1, 2; 712/21

[56] References Cited

U.S. PATENT DOCUMENTS

| | | | |
|---|---|---|---|
| 4,236,207 | 11/1980 | Rado et al. | |
| 5,327,553 | 7/1994 | Jewett et al. | |
| 5,768,585 | 6/1998 | Tetrick | 395/652 |
| 5,790,850 | 8/1998 | Natu | 395/652 |
| 5,904,733 | 5/1999 | Jayakumar | 713/2 |
| 5,933,624 | 8/1999 | Balmer | 395/553 |
| 5,938,765 | 8/1999 | Dove | 713/1 |

OTHER PUBLICATIONS

A Technical Reference for Designing PCs and Peripherals for the Microsoft Windows Family of Operating Systems, PC98 System Design Guide, Version 1.0—Sep. 5, 1997.

*Primary Examiner*—William Grant
*Assistant Examiner*—Ronald D Hartman, Jr.
*Attorney, Agent, or Firm*—Conley, Rose & Tayon, P.C.; Michael F. Heim

[57] ABSTRACT

A multiprocessor computer system is provided with a BIOS that allows parallel execution of system initialization tasks by at least two processors to reduce system boot-up time. At power-on, one of the processors is designated as a bootstrap processor and the remaining processors are designates as application processors. The processors are coupled to a shared memory module by a shared processor bus. The bootstrap processor is configured to instruct the application processor to test and initialize memory locations in the shared memory module while the bootstrap processor proceeds with other system initialization tasks which may include determining the system configuration, initializing peripheral devices, testing the keyboard, and setting up the BIOS data area with configuration information. After completing its tasks, the bootstrap processor determines whether the application processor has completed the memory test, and if so, the bootstrap processor proceeds to locate and execute an operating system. It is expected that testing and initializing memory in parallel with other system initialization tasks will advantageously reduce system boot-up time in multiprocessor systems having large memories (e.g. 1–4 gigabytes).

25 Claims, 3 Drawing Sheets

SHARED MEMORY INITIALIZATION METHOD FOR SYSTEM HAVING MULTIPLE PROCESSOR CAPABILITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to multiprocessor computer systems that distribute system boot-up tasks among the processors, and in particular, to a multiprocessor computer system in which the memory initialization task is assigned to one or more processors other than the bootstrap processor.

2. Description of Related Art

Due to the advent of power management technology and the more recent "instant-on" efforts, there are many ways in which a computer may exist in the "OFF" state. Examples include hard off (power is disconnected), soft off (power is supplied only to components which monitor activity external to the system), suspend mode (contents of memory are stored on disk and current state of computer is preserved while power consumption is reduced to a minimum level), and sleep mode (the clock signal is reduced or halted to some or all of the system components during periods of inactivity). The sleep and suspend modes may each be invoked at various levels, depending on the particular implementation of these modes, and recovery from these modes is implementation specific.

Turning a computer "ON" from the hard-off or soft-off states causes the computer to begin an initialization process (often referred to as "boot-up"). In the initialization process, a system reset signal is asserted and released. After the de-assertion of the reset signal, many of the system peripheral components initialize themselves, retrieve configuration information from dedicated electrically erasable programmable read-only memories (EEPROMs), and enter an initialized state. At the same time, the CPU resets itself and searches for instructions on how to prepare the system for operation. The initial instructions typically are included in the basic input/output system (BIOS) which is executable code stored in a nonvolatile memory such as a read-only memory (ROM). The BIOS is built-in software that contains low level code used to control the keyboard, display screen, disk drives, serial communications, and a number of miscellaneous functions. The BIOS also specifies a boot-up sequence for the CPU to execute to make the computer ready for operation. The CPU normally begins executing initialization routines from the BIOS ROM, but subsequently copies the BIOS code to main memory from which the BIOS code may thereafter be executed during normal computer operations.

Typically, the first thing that the BIOS instructs the CPU to do is to perform what is called the Power-On Self-Test, or POST for short. The POST is a built-in diagnostic program that checks much of the computer's hardware to ensure that everything is present and functioning properly, before the BIOS begins the actual initialization process. Some additional tests are performed later in the boot process. If any fatal errors are encountered, the boot process stops. After the initial POST, the BIOS instructs the CPU to locate the video system's built in BIOS program and to execute it to initialize the video card. The CPU then displays the BIOS's startup screen, and looks for other devices to see if any of them have initialization routines. If any other device initialization routines (e.g. IDE hard drive) are found, they are executed as well.

The CPU then does more tests on the system, including the memory count-up test which may be viewed on the video display. In one form, the memory test may be performed by writing a test pattern to every memory location and subsequently reading every memory location to verify that the test pattern was correctly stored. A second test pattern may also be employed so that each bit gets tested in both states. Finally, some operating systems require that the memory be zeroed out prior to loading and executing the operating system software. Consequently, for each memory location there may be up to five access operations during the memory test (write pattern #1, read pattern #1, write pattern #2, read pattern #2, write zeros). For a computer with one megabyte of no-wait-state memory and a 12 MHz bus, the memory test requires less than half a second.

If an error is encountered after the initialization of the video system, a text error message will generally be displayed on the video display. As the initialization process continues, progress is regularly reported on the screen. The BIOS boot-up sequence also includes a "system inventory" of sorts, performing more tests to determine what sort of hardware is in the system. Modern BIOSes have many automatic settings and may, among other things, automatically determine memory timing based on what kind of memory it finds. Many BIOSes can also dynamically set hard drive parameters and access modes, and will determine these at roughly this time. The BIOS will also now instruct the CPU to search for and label logical devices (COM and LPT ports). If the BIOS supports the Plug and Play standard, the CPU will detect and configure Plug and Play devices at this time and display a message on the screen for each one it finds. The CPU will often display a summary screen about the system configuration and begin a search for a boot device. Some modern BIOSes contain a boot table that specifies the order of devices which the system should try to boot from. If a first target device is present and properly configured for booting, the system will boot from this device. If the target device that the system tries is not found, the CPU will then try the next device in the boot table, and continue until it finds a bootable device. If no boot device at all can be found, the system will normally display an error message and then freeze up the system.

Having identified a target boot drive, the BIOS instructs the CPU to look for boot information to start the operating system boot process. For example, with a hard disk, the CPU may search for a master boot record at cylinder 0, head 0, sector 1 (the first sector on the disk). If the CPU finds the master boot record, the CPU starts the process of loading and executing the operating system, using the information in the boot sector. At this point, the code indicated by the boot sector takes over from the BIOS.

The boot devices which are accessed during the above boot-up sequence may include any nonvolatile storage device. Floppy disks, hard disks, magnetic tape, CD-ROMs, Flash ROMs, and network server disks are all examples of devices which can serve as a boot device. In order for a device to be a boot device, it must hold a copy of an operating system, and typically it needs to include a "boot-sector" that informs the CPU of the operating system's exact storage location. Typically, local devices (i.e. devices included in the computer or directly connected to the computer) are preferred over remote devices (i.e. devices that need to be accessed via a network or shared communications link) for booting the system. A local device is nearly always able to provide much quicker response when operating system components need to be retrieved.

With the increasing sophistication of computers, a substantial increase in the time required for booting-up a computer has occurred. One particular instance is the memory test. Many computer workstations are being provided with 1–4 gigabytes of memory. Even with no-wait-state memory and 100 MHz bus speed, a conventional memory test may easily require over 60 seconds. When this is added on to the time required for other initialization tasks, the boot-up time may begin to annoy regular users.

Many variations exist for the boot-up sequence conducted by the BIOS. In particular, efforts are being made to reduce the time required for a computer to boot up. Since computer hardware has become extremely reliable, a proposal has been made to eliminate POST tests from the normal boot-up sequence. In "Simple Boot Flag Specification: Version 1.0", Microsoft has proposed the use of a register to communicate boot options to the system BIOS. The boot flags are PNPOS, BOOTING, and DIAG. The PNPOS flag is asserted if the operating system normally used by the computer is Plug-and-Play capable. If this is the case, the BIOS doesn't need to spend time configuring components that the operating system will configure. The DIAG flag is de-asserted if hardware tests are considered unnecessary. In this case, the BIOS can skip the POST. The BOOTING flag, if asserted, indicates that the previous boot attempt did not successfully complete and the BIOS may choose to ignore the other flags and provide a complete system test and configuration sequence.

In many systems, particularly those performing critical roles, it is desirable to reduce boot-up time without sacrificing the assurance provided by performing the POST on a regular basis. Thus, a computer system is needed that reduces the initialization time required by conventional system implementations.

SUMMARY OF THE INVENTION

Accordingly, there is provided herein a multiprocessor computer system having a bootstrap processor and an application processor which concurrently perform system initialization tasks to reduce the system boot-up time. In one embodiment, the processors are coupled to a shared memory module by a shared processor bus. The bootstrap processor is configured to instruct the application processor to test memory locations in the shared memory module while the bootstrap processor proceeds with other system initialization tasks which may include such tasks as determining the system configuration, initializing peripheral devices, testing the keyboard, and setting up the BIOS data area with configuration information. After completing its tasks, the bootstrap processor determines whether the application processor has completed the memory test, and if so, the bootstrap processor proceeds to locate and execute an operating system. It is expected that testing and initializing memory in parallel with other system initialization tasks will advantageously reduce system boot-up time in multiprocessor systems having large memories (e.g. 1–4 gigabytes).

BRIEF DESCRIPTION OF THE DRAWINGS

A better understanding of the present invention can be obtained when the following detailed description of the preferred embodiment is considered in conjunction with the following drawing in which.

Figure 1:
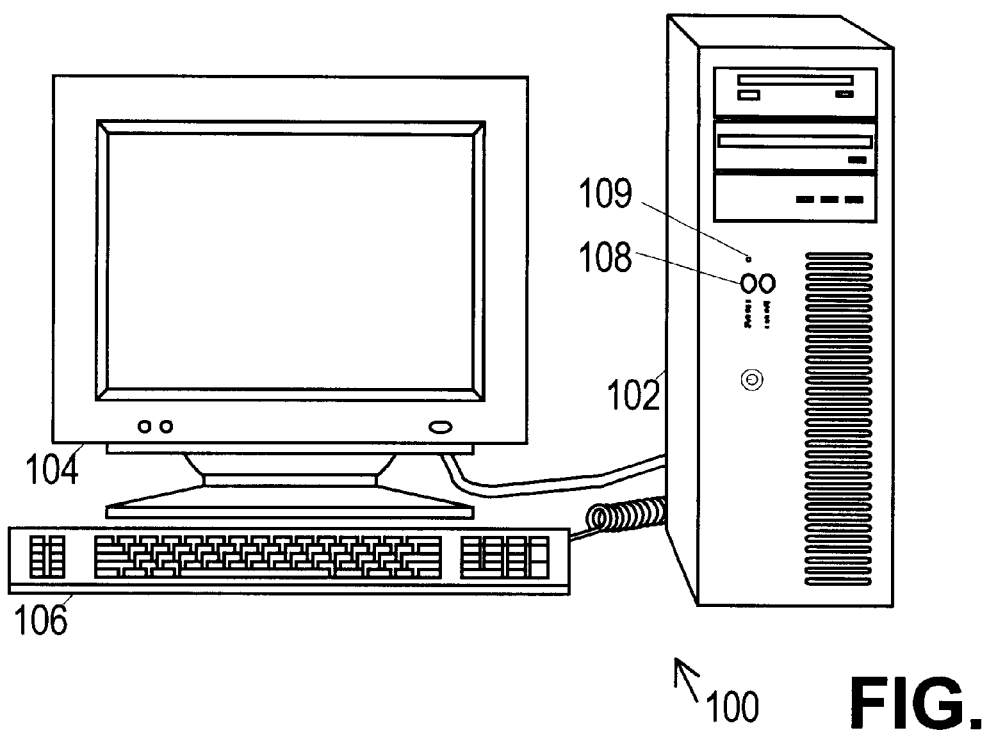
FIG. 1 shows a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

In addition, certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF PREFERRED EMBODIMENTS

Turning now to the figures, FIG. 1 shows a multiprocessor computer system 100 that is advantageously configured with a reduced boot-up time due to distribution of initialization tasks to more than one processor. Computer system 100 comprises a computer chassis 102 coupled to a display device 104 and a user input device 106. The computer chassis 102 has a power button 108 and may also have a power indicator 109 such as a light emitting diode (LED). When the power button 108 is momentarily pressed, power indicator 109 illuminates and computer system 100 boots up. Pressing power button 108 a second time places the computer system 100 in an OFF or SLEEP state.

Figure 2:
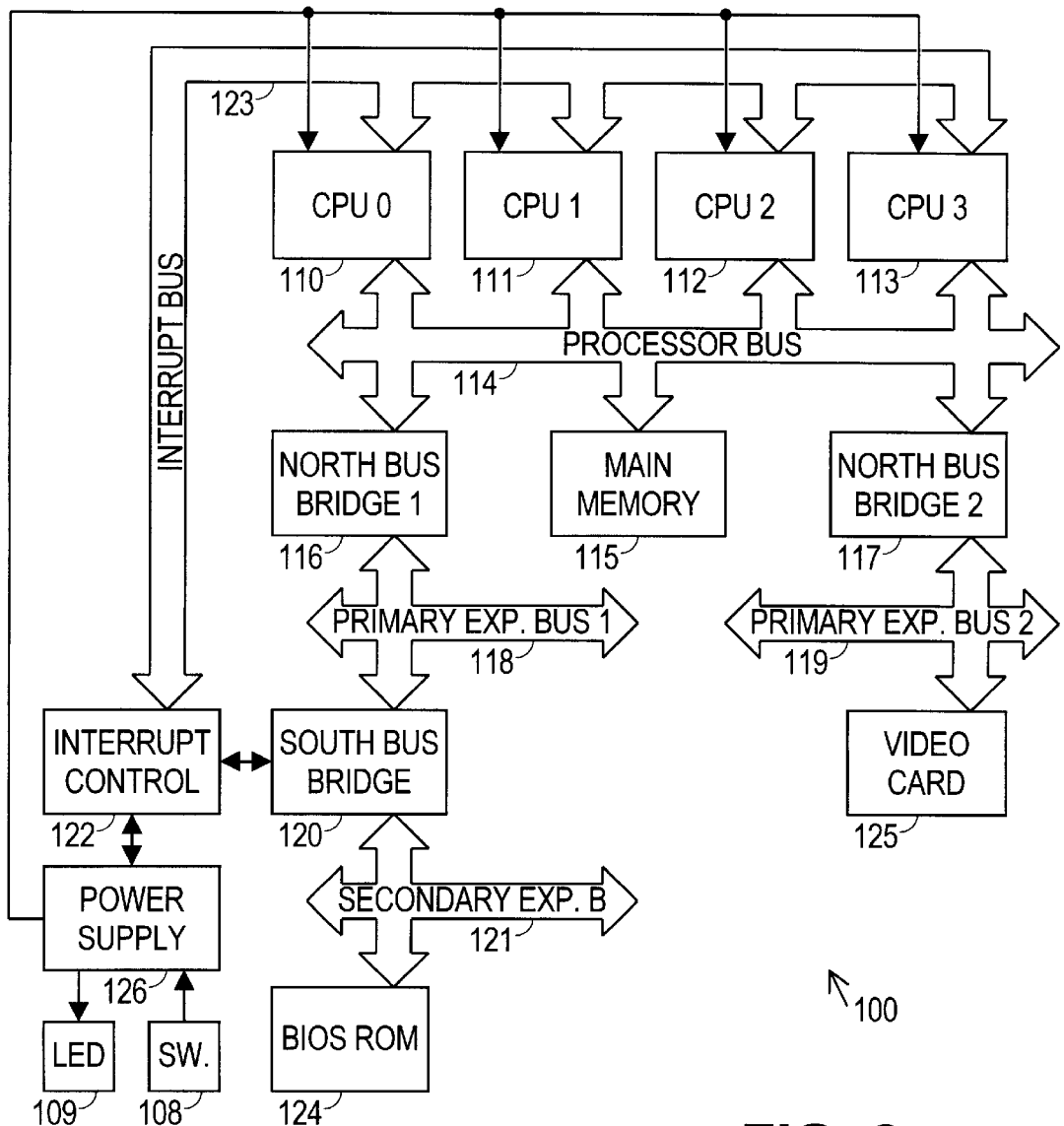
FIG. 2 is a functional block diagram of a computer system.

FIG. 2 illustrates an exemplary architecture of multiprocessor computer system 100. Computer system 100 includes at least two processors. The embodiment of FIG. 2, for example, includes four processors 110–113 (CPU 0, CPU 1, CPU 2, CPU 3). Computer system 100 also includes a shared processor bus 114, main memory 115, a North bus bridge 116, a primary expansion bus 118, a South bus bridge 120, a secondary expansion bus 121, an interrupt controller 122, an interrupt bus 123, a BIOS ROM 124, and a power supply 126. Computer system 100 may further include a second North bridge 117, a second primary expansion bus 119, and a video card 125. Many other system configurations are also contemplated.

Examples of suitable parts for system 100 include CPUs such as Intel Pentium, Pentium II, or Pentium Pro processors, and the North bridges 116, 117 may be RCC Corporation's LE bus bridge. Examples of suitable main memory 115 parts include dynamic random access memory (DRAM) and Synchronous DRAM. Main memory 115 preferably comprises 1–4 gigabytes (1 gigabyte=$2^{30}$ bytes).

Shared processor bus 114 couples the processors 110–113 to main memory 115 and North bridges 116, 117. Main memory 115 is shared by the processors 110–113 for storing and retrieving executable programs and data. Preferably, processors 110–113 are Pentium Pro processors, and shared processor bus 114 is a Pentium Pro bus. However, bus 114 may be any bus compatible with whatever processors are chosen.

North bridges 116, 117 each interface the shared processor bus 114 to a primary expansion bus 118, 119. Various system peripheral components may couple to either of the expansion busses 118, 119. Examples of such peripherals include graphics accelerators, video systems 125, sound cards, network interfaces, and external bus interfaces such as SCSI and IEEE 1394. In a preferred embodiment, the expansion busses 118, 119 are PCI busses, but they may be any suitable bus architecture.

The South bus bridge 120 interfaces one of the primary expansion busses 118 to a secondary expansion bus 121. Various system components may be coupled to the secondary expansion bus 121. Examples include hard disks, BIOS ROMs 124, and I/O controllers. In a preferred embodiment, the secondary expansion bus is an EISA bus, but may also be any other suitable bus. The South bus bridge may further interface with interrupt controller 122. Interrupt controller 122 monitors interrupt signals which may be provided from the various system components and may communicate interrupt messages to processors 110–113 via interrupt bus 123 in response to assertions of the interrupt signals or other system events. Any of the processors 110–113 may instruct the interrupt controller to communicate an system management interrupt (SMI) message via the interrupt bus 123 by writing to an appropriate register in interrupt controller 122. After recognizing an interrupt message, the processors may receive a corresponding interrupt vector from interrupt controller 122 that indicates the location of an associated interrupt handler routine. The interrupt controller 122 may further be configured to receive an interrupt signal from power supply 126 and generate an interrupt message to one or more of the processors to warn of an impending shutdown. Power supply 126 provides power to all of the computer components shown in FIG. 2 via connections not specifically shown. The power supply 126 is coupled to interrupt controller 122, power switch 108, and power indicator 109, and is further coupled to an external power source such as an electrical outlet (not specifically shown). Power supply 126 includes a power converter and some control circuitry for turning computer system 100 on and off in response to operation of power switch 108. The control circuitry may also generate logic signals such as a reset signal and an interrupt signal. The reset signal is coupled to each of the processors 110–113 and is asserted for a predetermined time after the computer system 100 is turned on. The reset signal is preferably also coupled to other system components.

Initialization of computer system 100 preferably includes performing a sequence of tasks. This task sequence may begin with causing every system component to enter an initial state at power-on. The initial state is preferably deterministic, that is, the initial state is predictable and happens every time the system is reset. A system reset signal may be used as an override signal to initialize all registers in each component. The peripheral system components which store configuration information in nonvolatile memory will then proceed to initialize themselves according to that configuration information. For example, video card 125 may be configured as a PCI device. Every time the video card is reset, it must configure some internal registers with identification and operational mode information.

When processors 110–113 are reset, an instruction pointer register is set to provide an initial instruction address of an instruction for the processor to execute, and this initial instruction address normally addresses a basic input/output system (BIOS) stored in BIOS ROM 124. The processor consequently retrieves the BIOS from BIOS ROM 124 and begins executing instructions therefrom.

The BIOS consists of multiple modules that usually include POST, setup, and system-related modules. One of the initial BIOS instructions executed by the processor preferably is a jump to the entry point of the POST module. The POST module is an executable program that may perform multiple functions including testing various system components, loading other modules into memory, and setting up system data structures in memory. The Setup module is an executable program which may be invoked to facilitate user inspection and modification of the system configuration. The System module is a set of interrupt service routines (ISRs) which are stored in memory and are permanently available while the computer is powered on. The System module includes code for controlling the keyboard, display screen, disk drives, serial communications and a number of miscellaneous functions.

One implementation of the POST module preferably causes one of the processors to perform the following tasks: a BIOS checksum test, a keyboard controller test, a CMOS register test, a system timer test, a memory refresh test, a base memory test, a CMOS battery test, a display controller test, a protected mode test, an address line test, a DMA controller test, interrupt vector table creation, BIOS data area setup, keyboard test, system configuration verification, and bootstrap loading. The POST module may also cause the processor to perform the following additional tasks: a processor register test, a cache memory test, and a read/write test of conventional and extended memory.

In conventional multiple processor systems similar to system 100, one processor 113 is designated as the bootstrap processor (BSP), and the remaining processors 110–112 assume the role of application processors (AP). Upon system power up, each processor executes an arbitration scheme designed to select one of the processors as the BSP. Thus the arbitration scheme winner is not necessarily a predetermined one of the processors 110–113. The arbitration scheme losers enter a wait state (i.e. go to sleep), while the winner designates itself as the BSP and executes the BIOS code. Conventionally, the BSP executes the above described POST tasks and additional tasks, and may further send an interprocessor interrupt (IPI) to the APs to have them conduct local tasks (e.g. tests of the processor registers and cache memory belonging to each AP). The BSP concludes the POST process by executing the bootstrap loader to load and transfer control to the operating system.

In accordance with a preferred embodiment the time required for system initialization is reduced by parallelizing the boot-up process so that one processor is not burdened with all of the non-local tasks. In particular, computer system 100 assigns at least part of the memory read/write test to an AP so that some memory testing may be conducted in parallel with other POST tasks.

Figure 3:
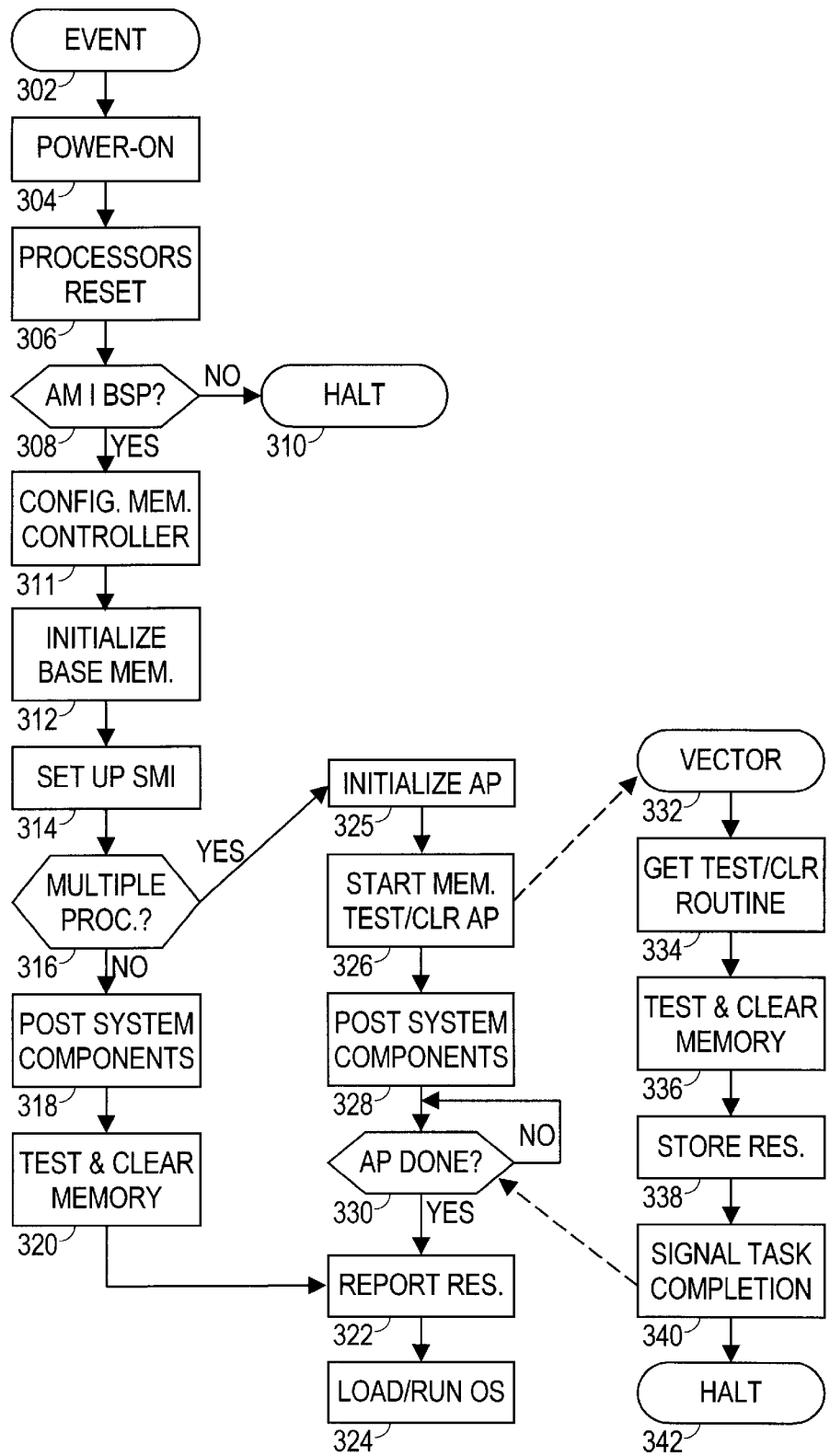
FIG. 3 illustrates a method for booting-up a computer.

FIG. 3 is an illustrative flowchart of a boot process for a multiprocessor system in accordance with a preferred embodiment. Initially the system is in an OFF state. In step 302 a power-on event occurs, e.g. a power button is pressed or a remote wake-up packet is sent. The event triggers a power-on step 304 in which power is supplied to the various system components and a system reset signal is momentarily asserted. In response to the reset signal, the system processors 110–113 enter an initial state in step 306. In step 308 the processors determine which of the processors will act as the bootstrap processor BSP, perhaps according to an arbitration process. The processors which are not the BSP halt at step 310 and wait for instructions from the BSP. The BSP proceeds to steps 311 and 312 where it may perform some initial POST tasks including, for example, configuring the memory controller for memory 115 and initializing a base portion of memory 115. Other tasks which may be performed in steps 311 and 312 may include the system timer test, the memory refresh test, and a base memory test. In one implementation, the first megabyte (1048576 bytes) of memory is tested and cleared by the BSP. Other base memory sizes are also contemplated. Next, in state 314 the BSP enables interprocessor communication which illustratively may be implemented using system management interrupts (SMI) and designated mailboxes in the initialized memory.

SMIs are software-generated interrupts for various system management functions including interprocessor communication, and are well known to one skilled in the art of multiprocessor system design. Further details on the use of interrupts may be found in many standard reference texts, including "VAX architecture handbook" published in 1981 by Digital Equipment Corporation, and "Assembly Language & Systems Programming for the IBM PC and Compatibles" by Karen Lemone, published in 1985 by Little, Brown & Company Limited.

Mailboxes are memory locations that are "owned" by one of the processors. Other processors can send a message to the owner of the mailbox by writing the message in the owned memory locations. As a method of communication between processors that operate in parallel, mailboxes are well known to one skilled in the art of multiprocessor system design. Further details on the use of mailboxes may be found in many standard reference texts, including "Operating System Concepts, 2ed" by James Peterson and Abraham Silberschatz, reprinted in 1987 by Addison-Wesley Publishing Company, Inc.

A test for the presence of other processors is performed by the BSP in step 316. This test may take many forms, including sending a message to all processors asking them to respond by writing a message to the BSP's mailbox. A lack of received messages after a suitable delay indicates that no other processors are present. Messages which are received may preferably include identification numbers of the processors so that the BSP can determine how many processors are present and where they are located. If the system does not include multiple processors, the BSP performs the rest of the POST tasks in step 318 and performs the memory read/write test in step 320. If no fatal errors are encountered, the BSP reports the results of the boot-up process in step 322 and executes the bootstrap loader in step 324, which locates and executes the operating system software.

The POST tasks of step 318 (and step 328) may include a variety of initialization tasks such as a processor register test, a BIOS checksum test, a cache memory test, a keyboard controller test, a CMOS register test, a CMOS battery test, a display controller test, a protected mode test, an address line test, a DMA controller test, interrupt vector table creation, BIOS data area setup, a keyboard test, peripheral device initialization, and system configuration verification. Step 328 may further include instructing other APs to perform tests of their registers and cache memory.

Step 320 (and 336) may preferably include writing test patterns to memory 115 and reading back the contents of memory 115 to verify correct operation of memory 115. Step 320 (and 336) may further include writing all-zero patterns to memory 115 to initialize memory 115 to a cleared state. In accordance with a preferred embodiment of the invention, computer system 100 tests main memory 115 by writing a known test pattern to each memory location and reading the contents of each memory location to verify that the value read from the memory is identical to the value written to the location. For example, a suitable memory test may include writing an alternating "1010 . . . " bit pattern to that memory location, reading the stored value to verify that it is correct, writing the inverse alternating bit pattern "0101 . . . ", reading the stored value to verify that it is correct, and writing an all zero bit pattern "0000 . . . " to clear the memory location. To increase the speed of the memory test, the memory locations may be tested in groups, i.e. write the first pattern to each location in the group, read from each location in the group, write the second pattern to each location in the group, read from each location in the group, and then clear each location in the group.

Returning to step 316, if a multiple processor environment is detected, then in step 325 the BSP may send an IPI to the other APs to have them conduct local tasks (e.g. tests of the processor registers and cache memory belonging to each AP). In step 326 the BSP instructs an AP to start performing the memory test. In one implementation, the BSP sends an interprocessor interrupt (IPI) to an AP with an interrupt vector that points to an entry point in the BIOS routine for performing the memory test. While the AP begins performing the memory test, the BSP continues with other POST tasks in step 328 before entering a wait loop 330. In wait loop 330, the BSP checks to see if the memory task is completed, and if so, the BSP proceeds to step 322 to do a summary report of the POST and memory test results.

The AP which receives the IPI message loads the interrupt vector into an instruction pointer register in step 332, retrieves the memory test routine in step 334, and performs a read/write test of the memory 115 in step 336. In step 336 the AP may also clear memory 115. In step 338 the test results (i.e. passed or failed with failure details) are prepared for communication to the BSP, which in one implementation may be done by storing the results in a mailbox location for the BSP. In step 340 the AP signals task completion to the BSP and halts in step 342. In a preferred embodiment, the AP causes a system management interrupt (SMI) to be sent to the BSP to cause the BSP to check its mailbox location for memory test results.

It may be desired for the progress of the memory test to be displayed on the computer's monitor. Since the BSP may be printing system configuration information to the display during the memory test, in one embodiment the AP accesses the video display memory directly to control a specific portion of the display screen.

System 100 may illustratively have 4 GB of memory 115, and bus 114 may operate at 100 MHz. Although the memory test may consequently require approximately a minute or longer to complete, the test may be performed in parallel with other initialization tasks to significantly reduce the boot-up time.

Some initialization tasks may need to be delayed until the memory test is complete. For example, the BSP may wait until after detecting the completion of the memory test to initialize some components such as a power management unit or memory type and range registers (MTRRs) if they could conceivably interfere with the memory test.

In one embodiment, the BSP instructs the AP to perform a memory read/write test on at least a portion of the system memory. For each memory location tested, this memory test may comprise writing a first test pattern, reading to verify correct retrieval of the first test pattern, writing a second test pattern, and reading to verify correct retrieval of the second test pattern. In this embodiment, the memory locations tested by the AP may be subsequently cleared by the BSP. Further, the clearing operation by the BSP may begin before the AP has completed testing all the assigned memory locations.

Hence, a method for reducing boot-up time in a multi-processor system has been described. Numerous variations and modifications will become apparent to those skilled in the art once the above disclosure is fully appreciated. For example, the POST tasks may be divided among three or more processors, and additional tasks may be allocated to other APs. It is intended that the following claims be interpreted to embrace all such variations and modifications.

What is claimed is:

1. A computer system which comprises:
   a shared memory module that includes a plurality of memory locations;
   an application processor coupled to the shared memory module by a shared processor bus; and
   a bootstrap processor coupled to the memory module by the shared processor bus and coupled to the application processor,
   wherein the bootstrap processor is configured to instruct the application processor to test the plurality of memory locations in the shared memory module after system power-on,
   wherein the bootstrap processor is configured to perform a plurality of POST tasks while the application processor is testing the plurality of memory locations,
   and wherein the bootstrap processor is further configured to execute a bootstrap loader after determining that the application processor has tested the plurality of memory locations.

2. The computer system of claim 1, wherein said plurality of POST tasks includes initializing peripheral devices.

3. The computer system of claim 2, wherein one of said peripheral devices is a PCI device, and wherein said initialization includes determining a PCI device address.

4. The computer system of claim 1, wherein said plurality of POST tasks includes verifying the system configuration.

5. The computer system of claim 1, wherein said plurality of POST tasks includes a keyboard test.

6. The computer system of claim 1, wherein said plurality of POST tasks includes setting up a BIOS data area in the shared memory module, and wherein said BIOS data area stores system configuration information.

7. The computer system of claim 1, wherein said plurality of POST tasks includes configuring a hard disk drive controller.

8. The computer system of claim 1, wherein the application processor is configured to test the plurality of memory locations in response to an instruction from the bootstrap processor, and further configured to store test results in the shared memory module for the bootstrap processor to read.

9. The computer system of claim 1, wherein the plurality of memory locations comprises all memory locations after a first megabyte (1048576 bytes) of memory in the shared memory module.

10. A method for booting-up a computer system, wherein the method comprises:
    resetting a plurality of processors;
    determining a bootstrap processor from the plurality of processors, wherein any remaining processors are designated as application processors;
    the bootstrap processor instructing an application processor to test a plurality of memory locations in a shared memory module;
    the bootstrap processor performing POST tasks while the application processor tests the plurality of memory locations; and
    the bootstrap processor searching for an operating system to load into the shared memory module after the application processor finishes testing the plurality of memory locations.

11. The method of claim 10, wherein the POST tasks performed by the bootstrap processor while the application processor tests the plurality of memory locations include initializing peripheral devices.

12. The method of claim 10, wherein the POST tasks performed by the bootstrap processor while the application processor tests the plurality of memory locations include verifying a system configuration.

13. The method of claim 10, wherein the plurality of memory locations comprises all memory locations after a first megabyte (1048576 bytes) of memory in the shared memory module.

14. A multiprocessor system which comprises:
    a shared memory module which requires initialization after system power-on;
    a plurality of processors coupled to the shared memory module to store and retrieve executable programs and data, wherein each of the plurality of processors is reset after system power-on and thereafter participates in an arbitration process to determine a bootstrap processor from the plurality of processors, and wherein any remaining processors from the plurality of processors are designated as application processors; and
    a nonvolatile memory coupled to the plurality of processors and configured to store a BIOS for retrieval by any of the processors, wherein the BIOS includes instructions for the bootstrap processor to direct an application processor to test a plurality of memory locations in the shared memory module,
    wherein the BIOS further includes instructions for the bootstrap processor to conduct one or more POST tasks while the application processor tests the plurality of memory locations.

15. The multiprocessor system of claim 14, wherein the one or more POST tasks includes initializing peripheral devices.

16. The multiprocessor system of claim 14, wherein the one or more POST tasks includes determining a system configuration.

17. The multiprocessor system of claim 14, wherein the plurality of memory locations comprises all memory locations after a first megabyte (1048576 bytes) of memory in the shared memory module.

18. The multiprocessor system of claim 14, wherein the BIOS further includes instructions for determining when the application processor has finished testing the plurality of memory locations, and includes instructions for the bootstrap processor to locate and run an operating system after the application processor has finished testing the plurality of memory locations.

19. A computer system which comprises:
    a volatile system memory having memory locations for temporarily storing data;
    at least two processors coupled to the system memory to read and write said data;
    a power switch;

a power supply coupled to the power switch to detect operation of the power switch, and coupled to provide power to the system memory and the processors in response to operation of the power switch, wherein the power supply is configured to assert a reset signal for a predetermined time after an initial operation of the power switch, wherein the processors are configured to receive the reset signal and configured to enter arbitration in response to assertion of the reset signal to select one of the processors as a bootstrap processor and to identify remaining processors as application processors, wherein the bootstrap processor is further configured to instruct at least one application processor to test memory locations in the system memory module, wherein the bootstrap processor is further configured to initialize peripheral devices while the memory is being tested by at least one application processor.

20. The computer system of claim 19, wherein the processors and system memory are coupled together by a shared processor bus.

21. A computer system which comprises:

a shared memory module consisting of a base portion and a remaining portion, each having a plurality of memory locations;

an application processor coupled to the shared memory module by a shared processor bus; and a bootstrap processor coupled to the memory module by the shared processor bus, wherein after the bootstrap processor tests the base portion of the shared memory module, the bootstrap processor instructs the application processor to test the remaining portion of the shared memory module, wherein the bootstrap processor is configured to perform a plurality of POST tasks while the application processor is testing the remaining portion of the shared memory module.

22. The computer system of claim 21, wherein said plurality of POST tasks includes initializing peripheral devices.

23. The computer system of claim 21, wherein said plurality of POST tasks includes verifying the system configuration.

24. The computer system of claim 21, wherein the application processor is configured to test the remaining portion of the shared memory module in response to an instruction from the bootstrap processor, and is further configured to store test results in the shared memory module for the bootstrap processor to read.

25. The computer system of claim 21, wherein the remaining portion of the shared memory module comprises all memory locations after a first megabyte (1048576 bytes) of memory in the shared memory module.

* * * * *